United States Patent
Bauer (10) Patent No.: US 11,167,402 B2
(45) Date of Patent: Nov. 9, 2021

(54) COMPRESSED AIR NAILER WITH AUTOMATIC OPERATING MODE AND A PLACING SENSOR

(71) Applicant: Joh. Friedrich Behrens AG, Ahrensburg (DE)

(72) Inventor: Joachim Bauer, Bad Oldesloe (DE)

(73) Assignee: Joh. Friedrich Behrens AG, Ahrensburg (DE)

( * ) Notice: Subject to any disclaimer, the term of this patent is extended or adjusted under 35 U.S.C. 154(b) by 78 days.

(21) Appl. No.: 16/349,815

(22) PCT Filed: May 15, 2018

(86) PCT No.: PCT/EP2018/062459
§ 371 (c)(1),
(2) Date: May 14, 2019

(87) PCT Pub. No.: WO2019/007575
PCT Pub. Date: Jan. 10, 2019

(65) Prior Publication Data
US 2019/0358798 A1     Nov. 28, 2019

(30) Foreign Application Priority Data
Jul. 7, 2017    (DE) ..................... 20 2017 104 073.9

(51) Int. Cl.
*B25C 1/00*    (2006.01)
*F16B 15/08*   (2006.01)
(Continued)

(52) U.S. Cl.
CPC .............. *B25C 1/008* (2013.01); *F16B 15/08* (2013.01); *B25C 1/043* (2013.01); *B25C 1/047* (2013.01); *B25C 1/188* (2013.01); *B25C 5/13* (2013.01)

(58) Field of Classification Search
CPC ......... F16B 15/08; B25C 1/008; B25C 1/043; B25C 1/047; B25C 1/188; B25C 5/13
See application file for complete search history.

(56) References Cited

U.S. PATENT DOCUMENTS 3,673,923 A * 7/1972 Volkmann ............... B25C 1/043
91/309
8,800,835 B2 * 8/2014 Perron .................... B25C 1/008
227/8

(Continued)

FOREIGN PATENT DOCUMENTS

| DE | 4032231 A1 | 6/1991 |
| DE | 102013106657 A1 | 1/2015 |
| EP | 2767365 A1 | 8/2014 |

OTHER PUBLICATIONS

PCT/EP2018/062459 filed May 15, 2018; International Search Report dated Aug. 20, 2018; 12 pages.

*Primary Examiner* — Andrew M Tecco
*Assistant Examiner* — Nicholas E Igbokwe
(74) *Attorney, Agent, or Firm* — Barclay Damon LLP (57) ABSTRACT

A compressed air nailer comprises a working piston connected to a driving tappet and configured to drive in a fastener and a triggering apparatus. The triggering apparatus comprises a manually actuable trigger, a placing sensor, and a force transmission element configured to interact with the manually actuable trigger and the placing sensor to actuate a control valve and trigger the driving process when the manually actuable trigger and the placing sensor are actuated together. The compressed air nailer is configured to continuously drive in fasteners in an automatic operating mode when the manually actuable trigger and the placing sensor are permanently actuated, and wherein displacing the placing sensor from the second position into the first position does not actuate the control valve when the manually (Continued)

actuable trigger is in an actuated position when the placing sensor is displaced.

12 Claims, 4 Drawing Sheets

(51) Int. Cl.
  *B25C 1/04* (2006.01)
  *B25C 1/18* (2006.01)
  *B25C 5/13* (2006.01)

(56) References Cited

U.S. PATENT DOCUMENTS

| | | | |
|---|---|---|---|
| 2001/0006183 A1* | 7/2001 | Mukoyama | B25C 1/008 227/8 |
| 2009/0159633 A1* | 6/2009 | Wu | B25C 1/008 227/8 |
| 2009/0242604 A1* | 10/2009 | Mina | B25C 1/047 227/8 |
| 2010/0252608 A1* | 10/2010 | Lai | B25C 1/047 227/8 |
| 2012/0097730 A1* | 4/2012 | Liang | B25C 1/044 227/130 |
| 2014/0231485 A1* | 8/2014 | Bauer | B25C 1/04 227/8 |
| 2016/0114470 A1* | 4/2016 | Weigmann | B25C 1/008 227/8 |

* cited by examiner

COMPRESSED AIR NAILER WITH AUTOMATIC OPERATING MODE AND A PLACING SENSOR

CROSS REFERENCE TO RELATED INVENTION

This application is a national stage application pursuant to 35 U.S.C. § 371 of International Application No. PCT/EP2018/062459, filed on May 15, 2018, which claims priority to, and benefit of, German Patent Application No. 20 2017 104 073.9, filed Jul. 7, 2017, the entire contents of which are hereby incorporated by reference.

BACKGROUND

The invention relates to a compressed air nailer with a working piston that is connected to a driving tappet for driving in a fastener and is supplied with compressed air when a driving process is triggered, and a triggering apparatus that has a manually actuatable trigger, a placing sensor and a force transmission element that works together with the trigger and the placing sensor so that it can actuate a control valve and trigger a driving process when the trigger and the placing sensor are actuated together.

Such compressed air nailers are known from the prior art. The placing sensor is a mechanical component that is held by a spring in a position projecting above an outlet tool of the compressed air nailer. If the compressed air nailer is placed onto a workpiece, the placing sensor is displaced against the force of the spring until the outlet tool abuts the workpiece. A driving process can only be triggered when the placing sensor is actuated in this manner. In this way, the compressed air nailer offers an effective protection from unintentional triggerings in comparison to devices without placing sensors.

For an individual triggering, compressed air nailers of this design are first placed onto a workpiece, which actuates the placing sensor. Subsequently, the trigger is manually actuated and this triggers an individual driving process. This mode of operation is also referred to as individual trigger operation.

In the case of some compressed air nailers with a placing sensor, a so-called contact trigger operating mode is also possible, also referred to as "touching." Then a driving process can be triggered in the case of a permanently actuated trigger by actuating the placing sensor. In practice, the compressed air nailer can be placed onto a workpiece and removed again therefrom multiple times in a row so that a plurality of fasteners can be driven in quick succession if necessary. This contact trigger operating mode, however, is associated with an increased risk of injury if an inattentive user unintentionally actuates the placing sensor when the trigger is actuated—for example, if he accidentally brushes the compressed air nailer against his leg while climbing a ladder. In order to eliminate this risk of injury, special compressed air nailers with a time control are known in which a contact triggering is always only possible for a short time after a previous triggering. An example is described in the patent application EP 2 767 365 B1.

Compressed air nailers with a placing sensor that can be put into an automatic operating mode are also known. If the trigger is permanently actuated when the compressed air nailer is placed onto the workpiece, fasteners are driven in continuously. In this manner, many fasteners can be processed very quickly. The automatic operating mode ends as soon as the trigger is let go of or the compressed air nailer is removed from the workpiece. With known automatic devices, the sequence of the actuation of trigger and placing sensor does not play a role. The first triggering can therefore be carried out both by actuating the trigger after the device has been placed onto a workpiece and also by contact triggering when the trigger is already actuated. The possibility of an unintentional contact triggering also presents an increased risk of injury with these devices.

BRIEF SUMMARY OF THE INVENTION

Against this background, it is the object of the invention to provide a compressed air nailer with which the automatic operating mode can be operated safely.

The compressed air nailer comprises:
a working piston that is connected to a driving tappet for driving in a fastener and is supplied with compressed air when a driving process is triggered, and a triggering apparatus that has a manually actuatable trigger, a placing sensor and a force transmission element that works together with the trigger and the placing sensor so that it can actuate a control valve and trigger a driving process when the trigger and the placing sensor are actuated together, wherein the compressed air nailer is configured to continuously drive in fasteners in an automatic operating mode when the trigger and the placing sensor are permanently actuated.
The placing sensor comprises an adjustment path between a fully actuated first position and a fully non-actuated second position, and
the triggering apparatus is configured so that the force transmission element does not actuate the control valve when the placing sensor is displaced from the second position into the first position with the trigger actuated.

As described, the triggering apparatus prevents the triggering of a driving process when the trigger is actuated as the result of an unintentional actuation of the placing sensor. A conventional contact triggering is not possible. Instead, the placing sensor must always be actuated first and then the trigger in order to trigger a first driving process. If the placing sensor and trigger then remain actuated, the device operates in the automatic operating mode.

In one embodiment, the triggering apparatus is configured so that, in the automatic operating mode with the trigger actuated, the control valve remains actuated until the placing sensor is displaced starting from the first position along the adjustment path into an intermediate position that has a specified distance from the first position. This embodiment is based on the awareness that doing away with the possibility of a contact triggering can lead to faults in the automatic operating mode that present as an undesired discontinuation of the automatic operating mode. The inventors have recognized that the cause for these faults is that the recoil acting upon the compressed air nailer during the driving in of a fastener can lead to a slight jump of the compressed air nailer if the compressed air nailer is not guided very exactly along on the workpiece and not pressed sufficiently strongly against its surface by the operator. In the case of such a jump, the placing sensor can quickly come out of the fully actuated position, which, in a conventional embodiment of the placing sensor, leads to an immediate discontinuation of the automatic operating mode even if the trigger remains actuated.

These difficulties are overcome by the particular embodiment of the triggering apparatus with an intermediate position: In the automatic operating mode with the trigger actuated, the control valve remains actuated until the placing sensor is displaced starting from the first, fully actuated position, in which it is located when the compressed air nailer is placed onto a workpiece, along the adjustment path into an intermediate position. The intermediate position has a specified distance from the first position. The actuation of the control valve and therefore of the automatic operating mode ends only when the compressed air nailer is removed so far from the workpiece that the placing sensor reaches the intermediate position. In an embodiment, the specified distance is chosen so that it is generally not exceeded by slight, more or less unavoidable jumps of the compressed air nailer. This enables trouble-free operation in the automatic operating mode.

The placing sensor is located in the second, fully non-actuated position when the compressed air nailer is removed so far from the workpiece that the placing sensor is no longer in contact with the workpiece. If the compressed air nailer is placed onto the workpiece, a displacement of the placing sensor from the second position into the first position occurs along the preferably straight adjustment path.

In one embodiment, the specified distance is 30% or more of the adjustment path. In particular, the specified distance can be 40% or more, 50% or more, 60% or more, or 70% or more, or even 80% or more of the adjustment path. The remaining portion to 100% of the adjustment path remains for the adjustment movement of the placing sensor from the intermediate position into the second position. By dividing the adjustment path into a first region between the first position and the intermediate position and a second region between the intermediate position and the second position, the function assigned to both regions is fulfilled reliably. In particular, the specified distance is large enough to avoid the explained unintentional ending of the automatic operating mode due to jumps. At the same time, a sufficient adjustment path between the intermediate position and the second position remains, which ensures that an unintentional triggering of the compressed air nailer when it is arranged at a distance from the workpiece continues to be avoided reliably.

In one embodiment, the specified distance is 3 mm or more. In particular, the specified distance can be 4 mm or more, 5 mm or more, 6 mm or more, 8 mm or more, or even 10 mm or more. Depending on the use case, the automatic operating mode can be continued without interruption even with larger jumps.

In one embodiment, the adjustment path has an overall length of 8 mm or more. In particular, the overall length can also be 10 mm or more, 12 mm or more, or even 14 mm or more. Tests have shown that an adjustment path that is enlarged in this manner relative to conventional compressed air nailers leads to a practical solution. In particular, the triggering apparatus can then be configured so that usual manufacturing tolerances and unavoidable wear phenomena in the region of the triggering apparatus do not impede the function.

In one embodiment, the control valve has a switching pin that is movable along an actuating path between a fully actuated first position and a fully non-actuated second position, said switching pin having a switching point that is arranged on an intermediate position of the switching pin at a distance from the first position. In this way, the triggering apparatus can be coordinated with the actuating path of the control valve so that the first position of the placing sensor corresponds to the first position of the switching pin and the second position of the placing sensor corresponds to the second position of the switching pin. The intermediate position of the placing sensor can correspond to the intermediate position of the switching pin. This solution is constructively particularly simple because the switching pin of the control valve, when the compressed air nailer is placed onto a workpiece, can be displaced starting from the switching point further into the first position when the placing sensor is displaced from the intermediate position into the first position. In particular, a substantially linear coupling between the adjustment path of the placing sensor and the actuating path of the control valve can be produced. The switching point of the control valve characterizes the operating point at which a change between a closed and an open position of the control valve, or vice versa, occurs.

In one embodiment, the force transmission element is arranged relative to the trigger and the placing sensor so that an engagement between the force transmission element and the trigger or between the force transmission element and the placing sensor is eliminated when the placing sensor passes the intermediate position on the path from the first position into the second position. At the same time as the elimination of this engagement, the actuation of the control valve and therefore the automatic operating mode ends.

In one embodiment, the force transmission element is mounted rotatably on the trigger. This represents a particularly simple solution of a coupling of the movement of the force transmission element to a movement of the trigger.

In one embodiment, the force transmission element has a stop that is taken with the placing sensor on the path from the second position into the first position when the placing sensor passes the intermediate position with the trigger actuated. The placing sensor taking the stop with it represents a simple possibility of producing an engagement between the placing sensor and the force transmission element.

In one embodiment, the force transmission element has an actuating surface that works together with a switching pin of the control valve. In this manner, the force transmission element can activate the control valve directly.

In one embodiment, the force transmission element is a rocker, one end of which is mounted rotatably on the trigger and the other end of which has the stop. The rocker can in particular be arranged completely or partially within the trigger. In this manner, a reliable and compact design of the triggering apparatus is achieved.

In one embodiment, the compressed air nailer has a time control that specifies a timing for the continuous driving in of fastener in the automatic operating mode. The timing can, for example, be chosen so that in the automatic operating mode 5 to 10 fasteners per second are driven in. Preferably, the time control operates pneumatically.

In one embodiment, the time control has a throttle with an adjustable opening cross-section, wherein the opening cross-section determines the timing. Accordingly, the automatic operating mode can be adapted to the respective requirements.

BRIEF DESCRIPTION OF THE DRAWINGS

The invention is explained in greater detail below based on an exemplary embodiment represented in seven figures. In the figures.

DETAILED DESCRIPTION OF THE INVENTION

Figure 1:
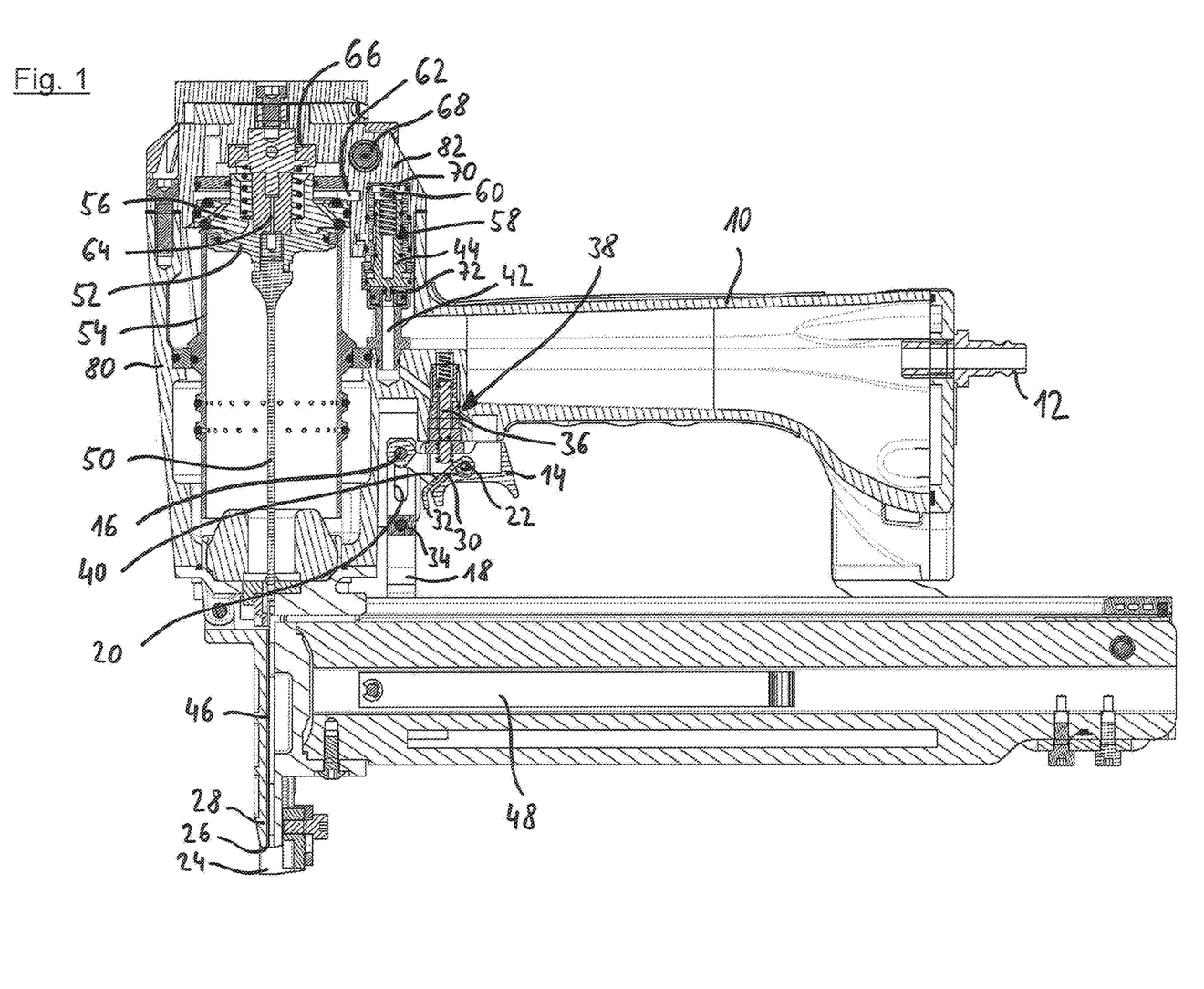
FIG. 1 illustrates a cross sectional view of an embodiment of a compressed air nailer.

First, the most important elements of the compressed air nailer are represented, partially in the form of an overview, with reference to FIG. 1. The compressed air nailer has a handle 10, on the rear end of which a central compressed air connection 12 is arranged. The handle 10 is located on a lower housing part 80 that is closed at the top by a housing cap 82.

The manually actuatable trigger 14 is mounted on the housing of the compressed air nailer in a pivotable manner about a pivot axis 16 and is arranged so that it can be actuated comfortably with the index finger by a user who is holding the compressed air nailer by the handle 10. FIG. 1 shows the trigger 14 in the actuated position.

In the arrangement shown in FIG. 1 with the compressed air nailer removed from a workpiece, the placing sensor 24 projects downwards with its front end over a mouth 26 of an outlet tool 28. This is the fully non-actuated second position of the placing sensor 24. If the compressed air nailer is placed onto a workpiece, the placing sensor 24 is displaced upwards against the force of a spring (not shown) until it terminates mostly flush with the mouth 26. It is then located in its fully actuated first position.

The placing sensor 24 has a slider 18 that moves up and down together with the front end of the placing sensor 24 when the placing sensor 24 is moved back and forth along the adjustment path between the first position and the second position. In the slider 18, an elongated hole 20 is formed, through which the pivot axis 16 of the trigger 14 passes.

A rocker 30 that serves as a force transmission element is mounted on one end in a pivotable manner about a pivot axis 22 on the trigger 14. The other, free end of this rocker 30 forms a stop 32 that can be taken along the adjustment path by a driver 34 designed on the slider 18 when the placing sensor 24 moves upwards. In this case, a control pin 36 of a control valve 38 is displaced upwards by an actuating surface 40 arranged on the upper side of the rocker 30 approximately in its middle, whereby a driving process is triggered. Details of the triggering apparatus with the placing sensor 24, force transmission element (rocker 30) and trigger 14 will be explained in greater detail below with reference to FIGS. 2 to 7.

The outlet tool 28 has a receiver 46, to which a fastener is fed from a magazine 48. From this position within the receiver 46, the fastener—for example a nail, a pin or a staple—is driven in by a driving tappet 50 that is connected to a working piston 52 of the compressed air nailer. For this, the working piston 52 is guided in a working cylinder 54. Above the working cylinder 54 and closing it in a sealing manner, a main valve 56 is arranged, and to the right of this a pilot valve 58.

A control space 42 is ventilated when the control valve 38 is actuated. In this manner, a control piston 44 of the pilot valve 58 is displaced upwards against the force of a spring 60. As a result, a chamber 62 is vented via the pilot valve 58 so that the main valve 56 opens and compressed air flows into the working cylinder 54 above the working piston 52, i.e., a driving process is triggered.

While the main valve 56 is open, compressed air also flows through a hole 64 to an intermediate chamber 66 and from there flows via a throttle 68 to a control space 70 of the pilot valve 58. This is arranged above the control piston 44 of the pilot valve 58. If a pressure threshold in the control space 70 is exceeded, the control piston 44 returns to the marked, lower position so that the chamber 62 is ventilated again, the main valve 56 closes and the working piston 52 is guided back into its marked initial position.

When the control piston 44 is displaced into the lower position, the control piston 44 is simultaneously driven out of the seal of the O-ring 72. If the control valve 38 continues to be actuated at this point, the control piston 44 is then once again displaced upwards and a further driving process occurs. The timing of the driving processes following each other in this automatic operating mode can be adapted by adjusting the adjustable throttle 68.

Figure 2:
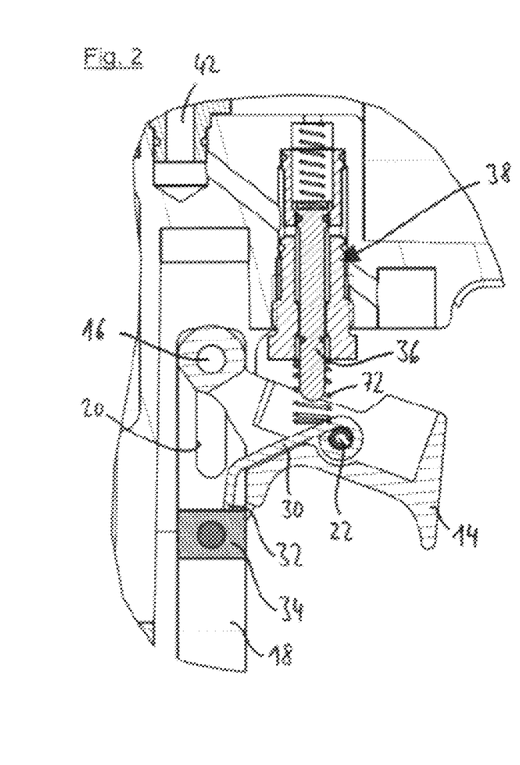
FIG. 2 illustrates an enlarged view of a portion of the embodiment of FIG. 1 in a non-actuated position.

It is explained with reference to FIGS. 2 to 4 how the interplay of the trigger 14, placing sensor 24 and rocker 30 can prevent unintentional triggerings. FIG. 2 shows the initial position of the triggering apparatus, i.e., the trigger 14 in the non-actuated position and the placing sensor 24 with the slider 18 in its second position.

The control pin 36 is located in a second position, below a switching point of the control valve 38, so that the control valve 38 is not actuated.

Figure 3:
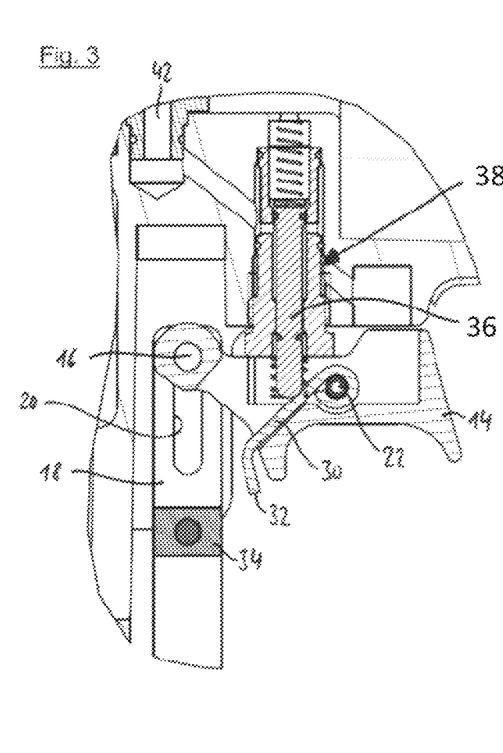
FIG. 3 illustrates an enlarged view of a portion of the embodiment of FIG. 1 in a partially actuated position.
Figure 4:
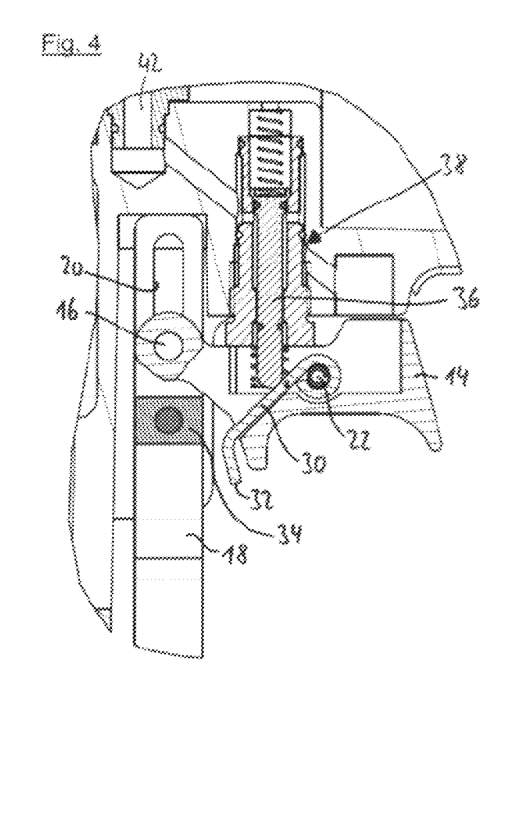
FIG. 4 illustrates an enlarged view of a portion of the embodiment of FIG. 1 in a fully actuated position.

Starting from the situation from FIG. 2, if the trigger 14 is first actuated, the arrangement shown in FIG. 3 results. The rocker 30 continues to point transversely downward from the pivot axis 22 so that that control valve 38 is not actuated. The displacement of the pivot axis 22 as a result of the actuation of the trigger 14 displaces the rocker 30 to the right overall in relation to the arrangement from FIG. 2 so that the stop 32 is arranged at a lateral distance from the driver 34.

If the compressed air nailer is subsequently placed onto a workpiece, this leads to a displacement of the placing sensor 24 with the slider 18 from the second position from FIGS. 2 and 3 along the adjustment path into the first and fully actuated position shown in FIG. 4. Due to the lateral distance between the driver 34 and stop 32 of the rocker 30, the driver 34 does not take the stop 32 of the rocker 30 with it along this adjustment path so that the position of the rocker 30 in relation to the situation from FIG. 3 remains unchanged and the control valve 38 is not actuated. An accidental triggering with the trigger 14 actuated by an unintentional contact of the placing sensor 24 is hereby excluded.

It is explained with reference to FIGS. 5 and 6 how an individual triggering occurs when the placing sensor 24 and the trigger 14 are actuated in the correct sequence. For this, FIG. 5 first shows the arrangement that results when the compressed air nailer, starting from the base state shown in FIG. 2, is placed onto a workpiece, first with the trigger 14 not actuated. This displaces the placing sensor 24 with the slider 18 into its first position, shown in FIG. 5. Along this adjustment path, the driver 34 takes the stop 32 of the rocker 30 with it so that the rocker 30, starting from the pivot axis 22, points transversely upward with the trigger 14 not actuated. In this position, the control valve 38 is not yet actuated.

Figure 5:
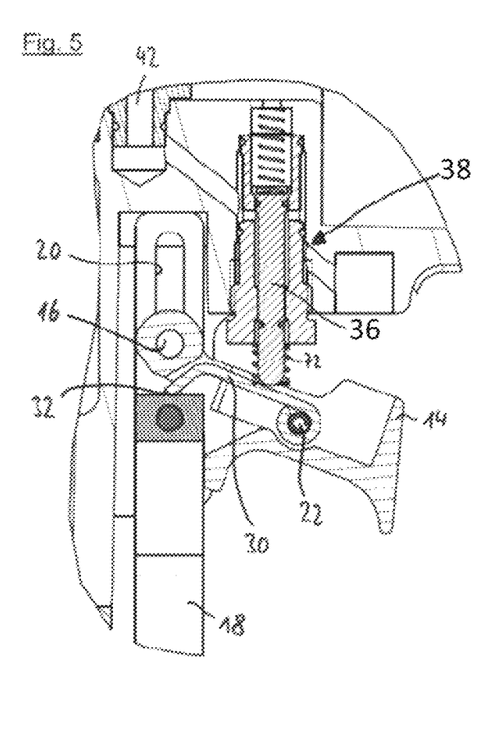
FIG. 5 illustrates an enlarged view of a portion of the embodiment of FIG. 1 where the trigger and control valve are in an non-actuated position.
Figure 6:
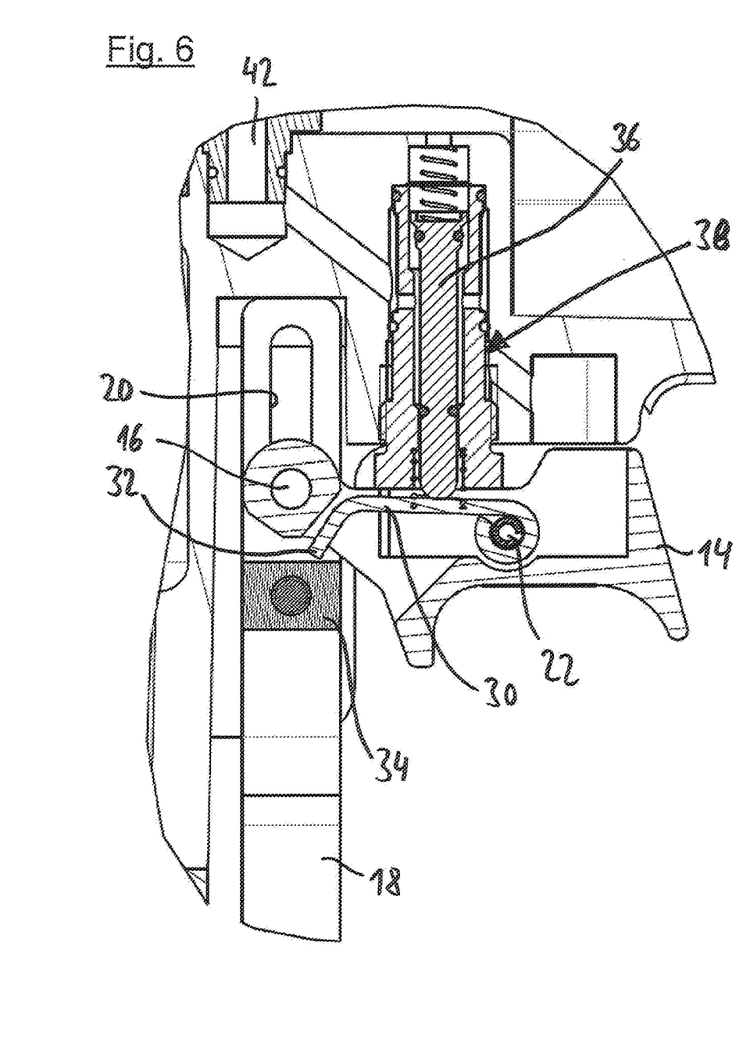
FIG. 6 illustrates an enlarged view of a portion of the embodiment of FIG. 1 where the trigger and control valve are in an actuated position.

Starting from the arrangement from FIG. 5, if the trigger 14 is actuated when the compressed air nailer is still placed onto the workpiece, the situation shown in FIG. 6 results.

Actuating the trigger 14 moves the pivot axis 22 upwards, while the stop 32 of the rocker 30 is supported on the driver 34. The rocker 30 thereby reaches a nearly horizontal position, in which the actuating surface 40 of the rocker actuates the control valve 38.

More exactly, this displaces the control pin 36 of the control valve 38 into the first position, shown in FIG. 6. In this position, it is located above a switching point of the control valve 38, and the control valve 38 is correspondingly actuated. Once the control valve 38 is actuated, a first driving process is triggered, as explained above with reference to FIG. 1. If the placing sensor 24 and trigger 14 then remain in their respective actuated positions, the compressed air nailer is in the automatic operating mode and fasteners are continuously driven in.

Figure 7:
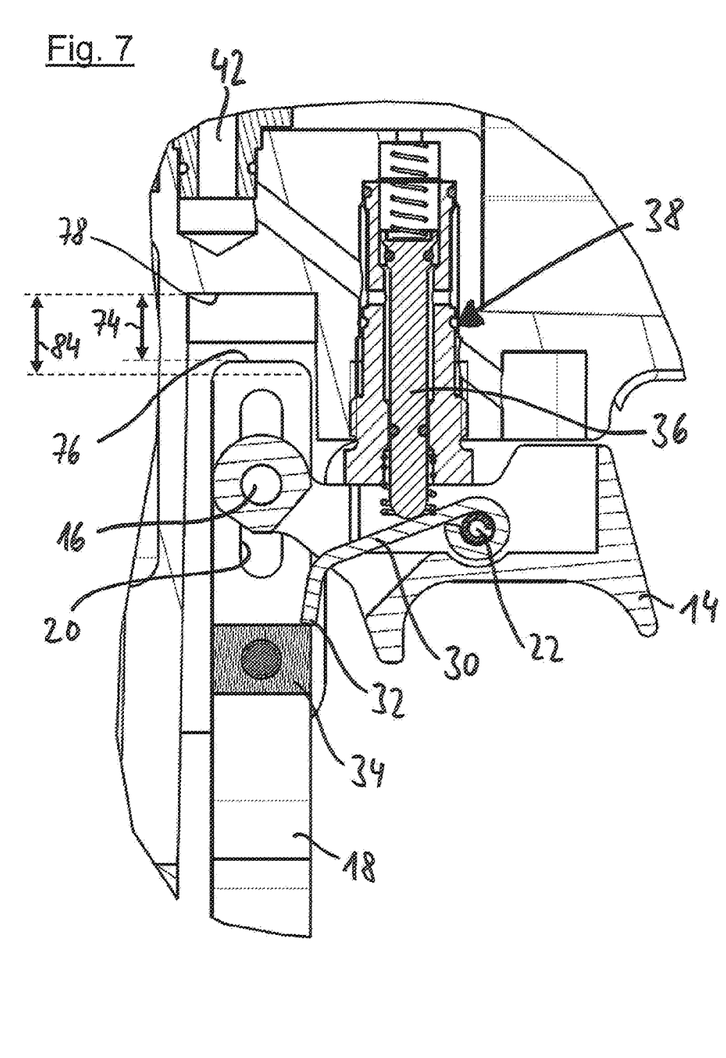
FIG. 7 illustrates an enlarged view of a portion of the embodiment of FIG. 1 where the trigger is in an actuated position and the compressed air nailer is arranged at a short distance from the workpiece due to a jump.

FIG. 7 shows the triggering apparatus with the trigger 14 actuated in a situation in which the compressed air nailer is arranged at a short distance from the workpiece due to a jump. The placing sensor 24 with the slider 18 is located in a middle position shortly before it reaches the intermediate position on the path from the first position into the second position. The stop 32 of the rocker 30 is just barely supported on the driver 34 in this middle position of the placing sensor. The distance 74 marked in FIG. 7 between an upper end 76 of the slider 18 and a stop 78 designed on the lower housing part 80 which the upper end 76 of the slider abuts in the first position of the placing sensor 24 (which is recognizable in FIG. 6) is somewhat smaller than the specified distance 84 between the first position and the intermediate position which is also marked in FIG. 7.

If the placing sensor 24 and therefore the slider 18 with the driver 34, starting from the position in FIG. 7, is only displaced downwards slightly further, it reaches its intermediate position, in which the stop 32 of the rocker 30 slips off from the driver 34 and the control pin 36 of the control valve 38 reaches its intermediate position and exceeds the switching point so that the control valve 38 no longer remains in the actuated position and the automatic operating mode ends. In the case of jumps of the compressed air nailer up to a height that corresponds to the position of the placing sensor 24 from FIG. 7, the automatic operating mode can, however, be continued without faults.

LIST OF REFERENCE NUMBERS

10 Handle
12 Compressed air connection
14 Trigger
16 Pivot axis of the trigger 14
18 Slider
20 Elongated hole
22 Pivot axis of the rocker 30
24 Placing sensor
26 Mouth
28 Outlet tool
30 Rocker
32 Stop
34 Driver
36 Control pin
38 Control valve
40 Actuating surface
42 Control space
44 Control piston
46 Receiver
48 Magazine
50 Driving tappet
52 Working piston
54 Working cylinder
56 Main valve
58 Pilot valve
60 Spring
62 Chamber
64 Hole
66 Intermediate chamber
68 Throttle
70 Control space
72 Spring
74 Distance
75 Upper end of the slider 18
78 Stop
80 Lower housing part
82 Housing cap
84 Specified distance

The invention claimed is:

1. A compressed air nailer comprising:
a working piston connected to a driving tappet and configured to drive in a fastener, wherein compressed air is supplied when a driving process is triggered; and
a triggering apparatus comprising,
a manually actuable trigger,
a placing sensor, and
a force transmission element configured to interact with the manually actuable trigger and the placing sensor to actuate a control valve and trigger the driving process when the manually actuable trigger and the placing sensor are actuated together,
wherein the placing sensor comprises an adjustment path between a first position that is fully actuated and a second position that is fully non-actuated,
wherein the compressed air nailer is configured to continuously drive in fasteners in an automatic operating mode when the manually actuable trigger and the placing sensor are permanently actuated, and wherein displacing the placing sensor from the second position into the first position does not actuate the control valve when the manually actuable trigger is in an actuated position when the placing sensor is displaced, and
wherein in the automatic operating mode with the manually actuable trigger being actuated, the control valve remains actuated until the placing sensor is displaced starting, from the first position along the adjustment path into an intermediate position that has a specified distance from the first position.

2. The compressed air nailer according to claim 1, wherein the specified distance is at least 30% of the adjustment path.

3. The compressed air nailer according to claim 2, wherein the specified distance is at least 3 mm.

4. The compressed air nailer according to claim 3, wherein the adjustment path has an overall length of at least 8 mm.

5. The compressed air nailer according to claim 1, wherein the control valve comprises a control pin configured to move along an actuating path between a fully actuated first position and a fully non-actuated second position, and wherein the control pin comprises a switching point that is Mined at an intermediate position of the control pin at a distance from the first position.

6. The compressed air nailer according to claim 1, wherein the force transmission element comprises an actuating surface configured to interact with a control pin of the control valve.

7. The compressed air nailer according to claim 1, further comprising a throttle with an adjustable opening cross-section, wherein the adjustable opening cross-section determines a timing of a continuous driving in of fasteners in the automatic operating mode.

8. A compressed air nailer comprising:
a working piston connected to a driving tappet and configured to drive in a fastener, wherein compressed air is supplied when a driving process is triggered; and
a triggering apparatus comprising,
a manually actuable trigger,
a placing sensor, and
a force transmission element configured to interact with the manually actuable trigger and the placing sensor to actuate a control valve and trigger the driving process when the manually actuable trigger and the placing sensor are actuated together,
wherein the placing sensor comprises an adjustment path between a first position that is fully actuated and a second position that is fully non-actuated,
wherein the compressed air nailer is configured to continuously drive in fasteners in an automatic operating mode when the manually actuable trigger and the placing sensor are permanently actuated, and wherein displacing the placing sensor from the second position into the first position does not actuate the control valve when the manually actuable trigger is in an actuated position when the placing sensor is displaced,
wherein the control valve comprises a control pin configured to move along an actuating path between a fully actuated first position and a fully non-actuated second position, and wherein the control pin comprises a switching point that is defined at an intermediate position of the control pin at a distance from the first position, and
the force transmission element is arranged relative to the trigger and the placing sensor such that an engagement between the force transmission element and one of: (1) the trigger, and (2) the placing sensor is eliminated when the placing sensor passes the intermediate position on the actuating path from the first position into the second position.

9. The compressed air nailer according to claim 8, wherein the force transmission element is rotatably mounted on the trigger.

10. The compressed air nailer according to claim 9, wherein the force transmission element comprises a stop that moves with the placing sensor on the actuating path from the second position into the first position when the placing sensor passes the intermediate position with the trigger actuated.

11. The compressed air nailer according to claim 10, wherein the force transmission element is a rocker, and wherein one end of the rocker is rotatably mounted on the trigger and another end of the rocker comprises the stop.

12. The compressed air nailer according to claim 8, wherein the force transmission element comprises an actuating surface configured to interact with a control pin of the control valve.

* * * * *

UNITED STATES PATENT AND TRADEMARK OFFICE
CERTIFICATE OF CORRECTION

PATENT NO. : 11,167,402 B2
APPLICATION NO. : 16/349815
DATED : November 9, 2021
INVENTOR(S) : Joachim Bauer It is certified that error appears in the above-identified patent and that said Letters Patent is hereby corrected as shown below:

In the Claims

Claim 5:
Column 8
Line 60 change "Mined" to --defined--

Claim 8:
Column 10
Line 5 change "the force" to --wherein the force--

Signed and Sealed this
Twelfth Day of July, 2022

Katherine Kelly Vidal
*Director of the United States Patent and Trademark Office*